United States Patent [19]

Cawley et al.

[11] 4,125,928

[45] Nov. 21, 1978

[54] METHOD AND APPARATUS FOR PULLING TUBES FROM HEAT EXCHANGER BAFFLES

[75] Inventors: Don Cawley, Port Neches; Bob Ohmstede, Beaumont, both of Tex.

[73] Assignee: Ohmstede Machine Works, Inc., Beaumont, Tex.

[21] Appl. No.: 825,392

[22] Filed: Aug. 17, 1977

[51] Int. Cl.² ........................................... B23P 19/02
[52] U.S. Cl. ..................................... 29/282; 29/427; 29/252
[58] Field of Search ............... 29/427, 709, 819, 252, 29/282; 254/93 R, 29 R; 214/1 P, 1 F, 730

[56] References Cited

U.S. PATENT DOCUMENTS 3,785,026  1/1974  Ohmstede ..................... 29/427 X
3,857,158  12/1974  Costello ........................... 29/427

Primary Examiner—Milton S. Mehr
Attorney, Agent, or Firm—Cushman, Darby & Cushman

[57] ABSTRACT

Ways and means are disclosed for removing old tubes from a tube bundle, consisting mainly of an array of transversally spaced tubes with tube sheets at their ends and baffles supporting the tubes of intermediate sites. The tubes are cut and driven from the respective tube sheets, then pulled out of the baffles. The apparatus includes a hydraulically reciprocable gripper that feeds an automatic throw stacker for pulling out tubes even if they are deformed, and for propelling them away from the apparatus.

6 Claims, 6 Drawing Figures

FIG. 1

METHOD AND APPARATUS FOR PULLING TUBES FROM HEAT EXCHANGER BAFFLES

BACKGROUND OF THE INVENTION

A shell and tube heat exchanger tube bundle consists mainly of an array of transversally spaced, coextensive, parallel tubes mounted in tube sheets at their opposite ends and supported at one or more intermediate sites by passing through transversally extending baffles. The tubes are tightly connected to or tightly engaged with the tube sheets and baffles.

As a rule, the tube sheets and baffles are longer lived than are the tubes, which develop leaks and need replacement.

The act of retubing a bundle is a conservative measure, as it reuses the tube sheets and baffles, sending only the old tubes and any other too-deteriorated parts to scrap.

To retube a bundle, one tube sheet is removed by cutting the tubes behind that tube sheet. The tubes are then driven out of the other tube sheet with an air hammer or the like. The task of pulling the tubes from the baffles remains, and the present invention addresses that task.

Costello, U.S. Pat. No. 3,857,158, issued Dec. 31, 1974 shows a small and portable device for pulling out tubes, after the tubes have been pulled an initial three inches or so by other means.

SUMMARY OF THE INVENTION

Ways and means are disclosed for removing old tubes from a tube bundle, consisting mainly of an array of transversally spaced tubes with tube sheets at their ends and baffles supporting the tubes at intermediate sites. The tubes are cut and driven from the respective tube sheets, then pulled out of the baffles. The apparatus includes a hydraulically reciprocable gripper that feeds an automatic throw stacker for pulling out tubes even if they are deformed, and for propelling them away from the apparatus.

DETAILED DESCRIPTION OF THE PRESENTLY PREFERRED EMBODIMENT

Figure 1:
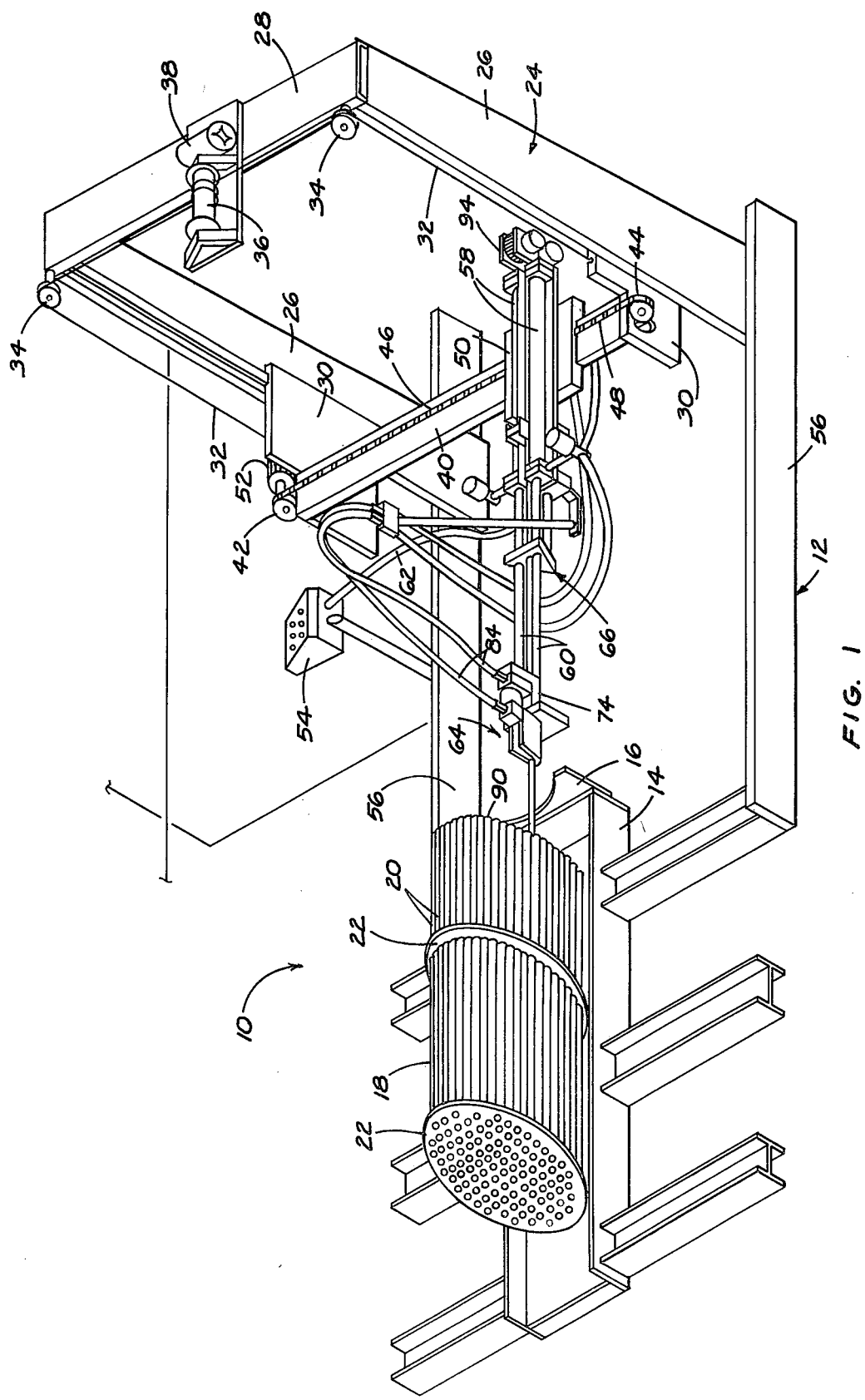
FIG. 1 is a perspective view of the tube pulling apparatus from the front.
Figure 2:
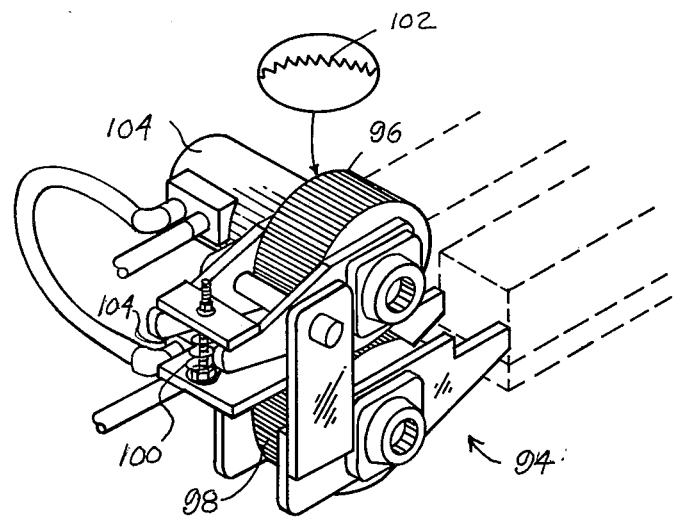
FIG. 2 is a view from approximately a diagonally opposite perspective, of a secondary tube puller and throw stacker provided at the rear of the primary tube pulling apparatus of FIG. 1.
Figure 3:
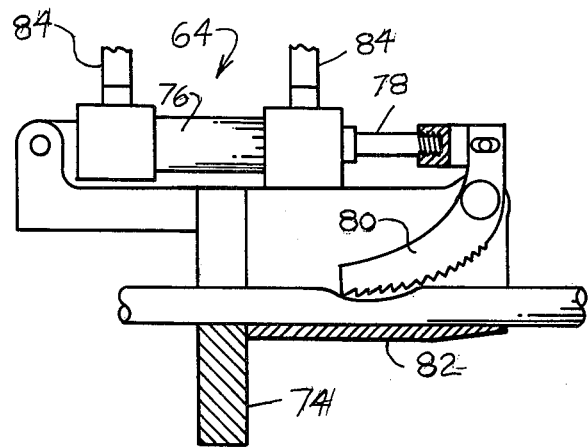
FIG. 3 is a fragmentary side elevation view of the primary tube gripper, with parts in longitudinal section to expose more detail.
Figure 4:
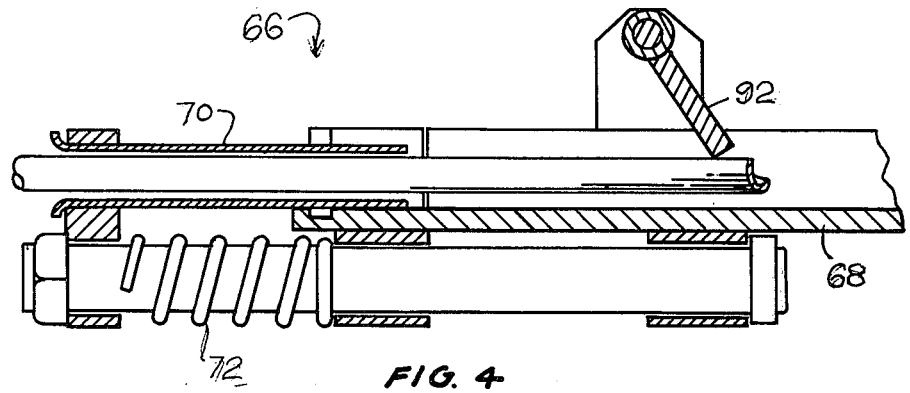
FIG. 4 is a fragmentary side elevation view of the tube guide assembly, also with parts in longitudinal section to expose more detail.

In FIG. 1, there is depicted a work station 10 for retubing tube bundles of shell and tube heat exchangers and the like.

At the station 10, there is provided a frame 12, which includes a cradle-like bracket 14 with an adjustable stop plate 16 secured on its inner end.

FIG. 1 depicts a stage in the retubing process, just after the process has been begun.

A tube bundle 18 has been placed in the cradle 14. Already, one of its tube sheets (the one which would have been nearest the viewer) has been removed, by cutting off the tubes 20 behind that sheet. In fact, as shown, the tubes 20 have been cut off near the forward face of the outermost one of the baffle plates 22. The tubes 20 have been separated from the tube sheet which was on the opposite ends of the tubes 20 (furthest from the viewer in FIG. 1) by driving out the tube ends with an air hammer or the like. The foregoing steps of removing the tube sheets are already conventional practice.

At the stage depicted in FIG. 1, the tube sheets already have been removed and the task at hand, is to pull the tubes 20 out of the baffle plates 22.

The tube bundle, tube sheets gone, may be adjusted axially inwardly along the cradle 14, using a crane or the like, until the inner ends of some of the tubes 20 abut the stop plate 16. Then the tube bundle and or the baffles may be clamped or otherwise secured (for instance using a girdle of chain), to the cradle 14 or to some other stationary part of the frame 12.

The frame 12 further includes a gantry 24 which spans the tube pulling axis of the station 10. The gantry 24 is shown including two transversally spaced uprights 26 bridged at the top by a horizontal cross bar 28.

The two uprights 26 mount two respective track carriages 30 for coordinate generally vertical movement therealong. In the embodiment shown, the track carriages 30 are suspended on cables 32 which pass over sheaves 34 and wrap helically around a spool 36 to which the cable ends are secured. Operation of the reversable motor 38 to which the spool is connected wraps identical amounts of the cables 32 on the spool 36 to raise and lower both track carriages.

A generally horizontal track 40 is secured to the track carriages 30 and extends transversally between them.

Sprockets 42, 44 are mounted at the ends of the track 40, each for rotation about a respective axis generally parallel to the tube pulling axis. An endless sprocket chain 46 is entrained about the sprockets 42, 44, with a run 48 above the track 40 and a return below it. A pulling tool carriage 50 is mounted on the track 40 for movement therealong between the ends of the track 40. The sprocket chain 46 is connected to the pulling tool carriage 50. A reversible motor 52 is drivingly connected to the sprocket 42 and mounted on the nearest track carriage 30.

Accordingly, the tool carriage 50 may be moved transversally of the tube pulling path by operating the motor 52.

An operator's control panel 54 is provided at the station 10, with buttons for operating the motors 38 and 52 to move the tool carriage 50 (and thus the tube pulling axis) to any address in an imaginary transversally extending vertical plane containing the tool carriage at the tube pulling station.

The distance between the gantry 24 and the cradle 14 is kept fixed by braces 56 which are connected between the cradle 14 and the respective gantry legs 26.

Two hydraulic cylinders 58 are mounted on the tool carriage 50 with some lateral spacing therebetween. Pistons 60 project axially outwards from the cylinders 58 parallel to the tube pulling axis and on opposite sides thereof. Double acting hydraulic line means 62 connect the piston/cylinder units 58, 60 with the control unit 54.

A gripper unit 64 is mounted at the forward ends of the two pistons 60. Between where the pistons 60 emerge from the cylinders 58 and where the gripper unit is mounted on the pistons 60, the pistons 60 pass through a tube guide assembly 66. The tube guide assembly includes a stationary frame 68 and a tube guide sleeve 70 that is mounted to the frame 68 by means of an interposed compression spring 72. When the pistons 60 are retracted, the gripper unit 64 engages the sleeve 70 and pulls it back, e.g. about 6 inches, compressing the spring. When the pistons 60 then extend, the tube guide sleeve 70 follows the gripper unit, until the spring 72 fully recovers. Thus, at the conclusion of the final pull of a tube, the recovering tube guide sleeve 70 will envelop the end of the pulled tube.

The gripper unit 64 includes a frame 74, mounted on the pistons 60, a hydraulic cylinder 76 mounted on the frame, a piston 78 which extends forwardly from the cylinder, and a toothed, pawl-like gripper arm 80 which pivotally depends obliquely toward a shelf 82 carried therebelow. The cylinder 76 is served by double acting hydraulic line means 84 which are connected to the control unit 54.

The pistons 60 have a thrust of e.g., four feet and are normally extended 3.5 feet. The piston 78 has a thrust of e.g. one inch and is normally fully retracted.

Figure 6:
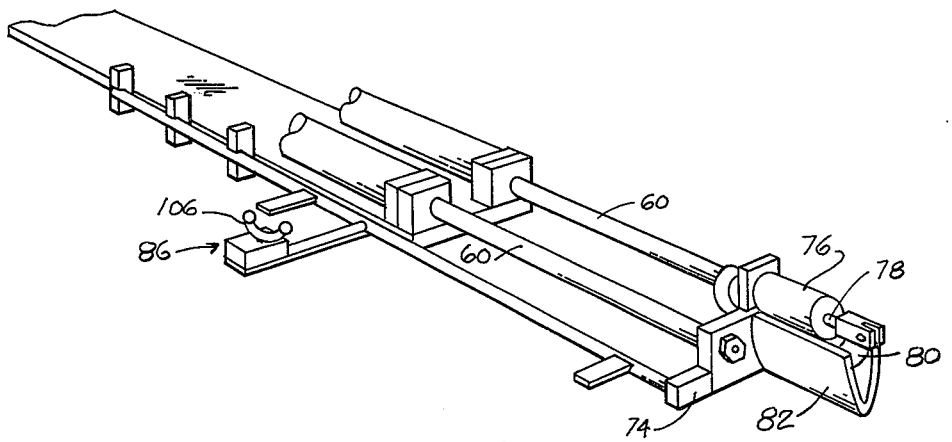
FIG. 6 is a fragmentary perspective view of the primary tube puller from the opposite side from FIG. 1.

Limit switch means 86 (FIG. 6) is provided to sense when the pistons 60 have become fully retracted, whereupon the gripper is released and the pistons are automatically extended 3.5 feet, the gripper takes a new bite and the tube is pulled out another 3.5 feet. When the tube 20 has been pulled fully free from the tube bundle, the operator releases button 2, the pistons 60 extend 3.5 feet and stop.

At this point, the gripper is about one-half inch behind the rear face 90 of the tube bundle.

Next, the motors 38 and 52 are operated to move the tube puller transversally of the face 90, until it is axially aligned with the next tube 20 to be pulled.

Figure 5:
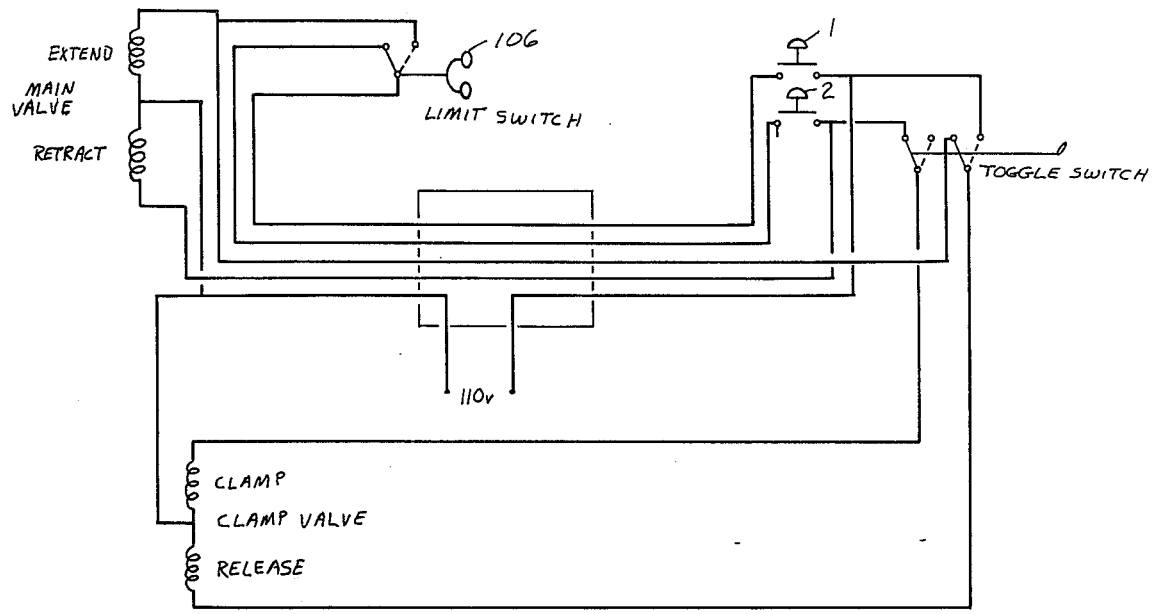
FIG. 5 is a schematic view of the hydraulic and electrical switching systems for the apparatus.

(Referring to FIG. 5, when the machine operator sees that the last stroke necessary to pull a tube has been completed, the operator releases control station 54 button 2. This opens the circuit to initiate retraction. The pistons 60 (FIGS. 1 and 6) continue forward until limit switch 106 is tripped and the tube puller stops in an extended condition. Next, the operator releases control station 54 button 1, this energizes the inching circuit which extends the pistons 60 far enough to grip the tube (e.g., 6 inches), until the end portion of that next tube lies between the gripper arm 80 and the shelf 82. The gripper arm is engaged to trap the tube and against the shelf 82. Finally, the operator depresses both buttons 1 and 2 so the pistons 60 reciprocate automatically until the tube is pulled.)

The swinging pawl 92 that is provided on the tube guide assembly 66 prevents the tube 20 that is being pulled out, from being mistakenly pushed back as the gripper unit is extended to take a next bite.

At the base of the cylinders 58, where the tube being pulled out emerges from between the cylinders 58, there is preferably provided a secondary gripper unit 94 for automatically throw stacking the tubes that are pulled out.

The throw stacker 94 includes a pair of rolls 96, 98, of which the latter is pivotally mounted, with a compression spring 100 providing a force tending to push the rolls 96, 98 together. Thus, a tube 20 inserted between the rolls 96, 98 causes spring compression that makes the rolls grip the tube. The rolls are externally toothed at 102 ratchet style, or knurled to provide a better grip. The rolls 96, 98 are driven by motors 104 at high R.P.M. and low torque. As a tube 20 which has been pulled from the bundle by the gripper unit 64 emerges and is gripped in the nip of the rolls 96, 98, it is propelled rapidly by the rolls and thus thrown from the vicinity, into a stack.

(If the tubes are so long that when they first engage in the nip of the rolls 96, 98, they are still tight in one or more of the tube bundle baffles, the rolls will stop rotating until the tube has been freed. When the tube becomes loose, the rolls begin in turn, and throw the tube as aforesaid.)

These steps are repeated until all the tubes have been pulled out.

Note that, by preference, the pulling of each tube proceeds automatically once it has been initiated and that once a tube is pulled free and thrown clear of the machine, the gripper extends to near the tube bundle face and pauses, waiting to be readdressed for pulling the next tube. The lone operator's principal tasks are thus to readdress the gripper unit, extend the gripper arm and shelf into tube end-trapping relation with the next tube to be pulled, and to initiate the pulling (which then proceeds to completion automatically).

It should now be apparent that the method and apparatus for pulling tubes from heat exchanger baffles as described hereinabove, possess each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. Apparatus for pulling tubes from a tube bundle, which includes at least one baffle plate through which a plurality of such tubes tightly pass, said apparatus comprising:

a. A cradle for securely supporting the tube bundle against axial movement of the whole tube bundle when a tube is being pulled axially therefrom;
   b. a gripper unit, including means for releasably gripping a tube to be pulled out;
   c. a tool platform having said gripper unit mounted thereon;
   d. a fixed frame;
   e. means movably mounting the tool platform on the fixed frame for transverse movement to bring the gripper unit to an address where it is in axial alignment with any selected one of the tubes that is to be pulled out next;
   f. axially extensible-retractile means interconnecting the gripper unit and tool platform, for thrusting the gripper unit axially forwards into adjacency with the tube bundle and for pulling a gripped tube axially from the bundle;
   g. means interconnecting the gripper unit and said axially extensible-retractile means for axially advancing the gripper unit into gripping relation with the tube that is to be gripped and pulled from the bundle in the next pull;

h. means for sensing that the first axially extensible-retractile means is fully retracted, and, in response to such sensation, releasing the gripper unit from gripping relation to the tube and extending the first axially extensible-retractile means until the gripper unit is thereby thrust into adjacency with the tube bundle;

i. stop means stationed to engage with each tube when that tube is partially withdrawn in a sense to prevent reverse axial travel of that tube back toward the tube bundle;

j. means for sensing whether, when the gripper unit has been thrust into adjacency with the tube bundle, I. the gripper unit remains beside an axially further upstream portion of the same tube the gripper unit had just pulled axially from the bundle or II. the gripper unit no longer remains beside a tube, meaning that the tube the gripper unit had just pulled axially from the bundle has been completely withdrawn and advanced past the gripper unit, and if (I) is sensed, signal the axially extensible-retractile means to automatically place the gripper unit in gripping relation with the pipe again and fully retract again, but if (II) is sensed, await readdressing of the tool platform.

2. The apparatus of claim 1, further including:
a second gripper unit stationed downstream of the first-described gripper unit, and comprising a pair of toothed counter-rotating rolls having a nip between them in the path of each tube as that tube is being pulled out by the first-described gripper unit;
means for driving the counter-rotating rolls when there is less than a selected resistance to their turning, and for permitting said rolls to remain idle when the incumbent resistance is greater than said selected resistance,
for withdrawing the tubes being pulled out, from the vicinity of said apparatus.

3. The apparatus of claim 1, wherein:
the means (g) is a second axially extensible-contractile means.

4. The apparatus of claim 3, wherein:
the first-described axially extensible-contractile means, in extending from being fully retracted brings the gripper unit to approximately half an inch from the tube bundle, and
wherein when the gripper unit is in axial alignment with a tube to be pulled from the bundle next and the second axially extensible-contractile means when extended carries the gripper unit into embracing relation with an end portion of that tube which is next to be pulled from the tube bundle.

5. The apparatus of claim 4, wherein:
the gripper unit includes a shelf which in use is disposed against one side of the tube and a jaw provided with means for releasably squeezing that jaw into biting relation with said shelf, in opposition thereto.

6. The apparatus of claim 1, further including:
rigid brace means securing the fixed frame to the cradle to prevent pulling the cradle and tube bundle axially when trying to pull a tube from the bundle.

* * * * *